United States Patent Office 3,716,386
Patented Feb. 13, 1973

3,716,386
PROCESS FOR DISPERSING FIBRE
IN AN AQUEOUS MIX
Edward Kempster, Kings Langley, England, assignor to
National Research Development, London, England
No Drawing. Filed Nov. 9, 1970, Ser. No. 88,201
Claims priority, application Great Britain, Nov. 12, 1969,
55,419/69
Int. Cl. C04b 7/02
U.S. Cl. 106—90                                   8 Claims

ABSTRACT OF THE DISCLOSURE

A process for preparing a fibrous mix in which the fibre content of the mix is immersed in a solution of polyethylene oxide or methyl cellulose prior to its incorporation in the mix. Examples are described in which the basic constituent of the mix is cement or plaster and the fibres are glass fibres, steel wires, or nylon fibres.

---

The present invention relates to the preparation of mixes and in particular to the preparation of fibrous mixes by which is meant mixes whose constituents comprise fibres and a slurry or paste e.g. glass fibres with a powder of the basic material or materials (cement or plaster or the like with or without additives) and water (or any other suitable liquid e.g. an aqueous solution). The term "fibres" as used herein embraces single filaments e.g. metal wires or multi-stranded fibres or "rovings." The term "mix" as used herein means an aggregation of the constituent materials and it is not intended to imply that this aggregation has necessarily been treated in any way, e.g. in an effort to provide a homogenous mixture of these materials.

Many different designs of mixer are at present available for general mixing purposes but those investigated have been found to be something less than satisfactory when used with a "fibrous mix" as above defined. In such cases, lumps are inevitably found to form in the mix during operation of the mixer unless special precautions are taken, e.g. by adding the fibres to the slurry or paste continuously or by sprinkling in handfuls of fibre one at a time. This ensures that at any instant only a small quantity of unmixed fibre is present in the mix. If too great a quantity of fibres is added too quickly, however, or if the final fibre content in the mix is excessive then lumps will form and once formed there lumps will not disappear even after prolonged mixing. Thus, if fibrous mixes are prepared with the known types of mixer, the process must, to be successful, be slow and even so a maximum value is imposed on the fibre content in the final mix if lumping is to be avoided.

The same problem arises whether the basic constituent of the mix concerned is cement, plaster or some other material and whether the fibres are glass-fibres or for example steel wires, or fibres of some other material such as nylon, carbon or asbestos for instance.

According to the present invention a process for mixing a fibrous mix comprises the step of treating the fibre content of the mix with a high viscosity friction-reducing substance prior to the bringing together of the fibre constituent with the basic constituent of the mix. The substance is conveniently in the form of a solution and preferably comprises a water soluble polymer in solution e.g. with a viscosity of eighty centiposes upwards at 25° C. A convenient solution for this purpose is prepared from polyethylene oxide and in a preferred embodiment of the invention, the fibres are pretreated in an aqueous polyethylene oxide solution before they are brought together with the basic constituent of the mix. The basic constituent may for example be a plaster or cement powder and part of the water content for the mix can be supplied by the water content of the aqueous solution. Typically, the fibres would be glass fibres in the form of multi-stranded "rovings," but the fibres, may instead be steel wires or fibres of some other material such as nylon, carbon, or asbestos. Where glass fibres are used in a cement or cement/aggregate mix in accordance with the present invention, the fibres must be of alkali resistant glass if they are to resist attack by the other constituents of the mix. Suitable alkali-resistant glass fibres are disclosed in U.K. Pat. 1,200,732, U.K. patent application 35,901/67 (corresponding Belgian Pat. 719005) and U.K. Pat. 17,448/69 (corresponding German patent application P 20 15 853.6). Typically, and in the examples given in the specification, these fibres are in the form of "rovings" each consisting of 29 strands, and each strand comprises 204 "K" filaments.

The particular effectiveness of polyethylene oxide in the method of the present invention is thought to result, at least in part, from the very high molecular weight of this substance e.g. from 100,000 up to about 5 million. Polyethylene oxide is commercially available under the trade name "Poly-ox" from the manufacturers, Union Carbide. Grade WSR-301 has been found to be especially suitable. This grade has a molecular weight of about 4 million and a 0.1% aqueous solution of this grade has a viscosity of between 2000 cp. and 3000 cp. at 25° C.

An alternative to polyethylene oxide is a high molecular weight cellulose ether such as methyl cellulose. This is commercially available, under the trade name "Celacol" from British Celanese Limited. Grade M2500 powder DS has been found especially suitable. This grade has a molecular weight of between 180,000 and 250,000 and a 1% aqueous solution of this grade has a viscosity of about 100 cp. at 25° C.

The invention also extends to a substantially lump-free mix which has been treated by the above method in accordance with the present invention and to articles made with such a mix.

By way of example, in a process in accordance with the present invention, ten grams of "Poly-ox WSR-301" (a fine powder) is added to ten kilograms of water and the mixture agitated for a few minutes to dissolve the powder. 500 grams of the glass fibres (alkali resistant) are then added and pushed below the surface of the solution where they are mixed in by hand for three to four minutes whilst they became coated with the solution. Alternatively a power-operated mixer may be used to agitate the water/Poly-ox mixture and then to mix the fibres into the resulting solution. 25 kilograms of sand and 25 kilograms of cement are next added to the mixture (or the mixture added to the sand and cement) and a further three or four minutes mixing in a "cumflow" size "0" pan mixer or other conventional concrete mixer results in the more or less uniform dispersal of the fibres within the concrete mix. This latter step is identical to that which would be carried out in mixing the concrete in the usual way from a conventional mix. The lubricating and friction-reducing action induced by the viscous solution ensures that the fibres do not ball-up.

As an alternative to Poly-ox WSR-301, a cellulose ether (methyl cellulose) in the form of Celacol M2500 Powder DS may be dissolved in water to give the high viscosity friction-reducing substance referred to elsewhere in this specification. Otherwise, the steps carried out in preparing the mix are identical (apart from the different proportions involved) to those already described above using Poly-ox as the additive.

Obviously the invention is equally effective in producing a satisfactory fibrous mix if the sand constituent is omitted entirely or if it is replaced (or accompanied) by adding some other aggregate constituent e.g. pulverised fuel ash, to the Poly-ox/fibre or Celacol/fibre mixture.

The following tables show examples of mixes in which glass fibres have been successfully incorporated using the methods above described in accordance with the present invention:

| Proportions by weight | Water/ cement ratio | Percent glass fibre | Length of fibre, mm. | Percent polyethylene oxide |
|---|---|---|---|---|
| Cement 1, Sand 1 | 0.4 | 1 | 11 | 0.02 |
| Cement 1, Sand 1 | 0.5 | 5 | 22 | 0.02 |
| Cement 1, Sand 1 | 0.65 | 10 | 43 | 0.04 |
| Cement 1, Sand 2 | 0.6 | 6 | 43 | 0.02 |
| Cement 1, PFA 1 | 0.7 | 4 | 22 | 0.02 |
| Cement 1, PFA 2 | 1.1 | 4 | 22 | 0.02 |
| Cement only | 0.42 | 8 | 43 | 0.04 |

| Mix proportions by weight | | | Glass fibre, percent | Glass fibre length, mm. | Water-cement ratio | Cellulose ether, percent |
|---|---|---|---|---|---|---|
| Cement | P.F.A. | Sand | | | | |
| 1 | | | 5 | 43 | 0.35 | 0.4 |
| 1 | | | 5 | 22 | 0.35 | 0.4 |
| 1 | 1 | | 5 | 43 | 0.88 | 0.4 |
| 1 | 1 | | 5 | 22 | 0.88 | 0.4 |
| 1 | | 1 | 5 | 43 | 0.62 | 0.4 |
| 1 | | 1 | 5 | 22 | 0.62 | 0.4 |

In these tables, the percent of glass fibre is the proportion (by weight) of the glass fibre content in the mix relative to the other "dry materials" in the mix. By "dry materials" in this context is meant the cement and either the P.F.A. (if present) or the sand (if present). Thus a glass fibre content of 5% (in the tables) means 5 parts (by weight) of glass fibres to 100 parts (by weight) of the dry materials in the mix. The percent of additive (polyethylene oxide or cellulose ether) is similarly expressed as the proportion by weight of the additive in the mix relative to the dry materials (as above defined) in the mix. Thus a 0.4% additive content (in the tables) means 0.4 parts (by weight) of the additive to 100 parts of the cement and either the P.F.A. (if present) or the sand (if present). The abbreviation P.F.A. stands for pulverised fuel ash.

It is an advantage of the process in accordance with the present invention that no special mixing equipment is required, although the mixer of a co-pending United Kingdom patent application No. 27,872/69 can be used, of course, if desired.

When using fibres that do not absorb water as, for example, steel wires, to prepare a fibrous cement mix in accordance with the present invention, less water is needed. In such cases it has been found that the procedure and order of loading the materials into the mixer that give the best dispersion of fibres is to prepare the high viscosity friction-reducing substance as a gel-like solution e.g. by mixing polyethylene oxide and water, as already described; to add sand; to add fibres at a slow steady rate; and finally, to add cement, the basic constituent.

In one such mix prepared in accordance with the present invention 8 grams of Poly-ox WSR–301 were dissolved in 8 kilograms of water, 26.6 kilograms of zone 3 sand added and then 2 kilograms of 1 inch length steel fibres (0.006 inch diameter). Finally the cement (13.3 kilograms) was added and the whole mixed up in a "Cumflow" mixer as above described in relation to the glass fibre/concrete mix.

In an alternative embodiment the fibres are nylon fibres instead of steel wires. Thus in one such example the mix is a sand/cement mix and the sand is added to the Poly-ox solution after the fibre content has been added to the Poly-ox solution (as with the "glass-fibre" embodiments). Typical mix proportions are 20 kilograms cement, 20 kilograms zone 3 sand, 500 grams 4 denier nylon (2.5%), 8 kilograms of water (0.4 water/cement ratio), 8 grams Poly-ox WSR–301.

In a further embodiment, the basic constituent is plaster instead of cement. Thus in one such example 5 grams of Poly-ox WSR–301 is dissolved in 21.6 kilograms of water and 1.78 kilograms of E glass (11 mm. length fibres) are added to the Poly-ox solution as already described in the glass fibre/cement mixes. The plaster content is provided by 24 kilograms of "Crystacel" plaster and 24 kilograms of "fine castings." A retarder e.g. "Kerapin" is preferably incorporated in the mix to delay hardening of the plaster constituent.

Other advantages of the invention are that its success does not appear to be limited to the use of a narrow range of fibre lengths and the quantity of fibre that can be mixed does not appear to be restricted by the mixing process at least 10% (by weight) of fibres having been successfully incorporated into the mix without the formation of lumps. This compares favourably with a maximum possible fibre content of between 1% and 2% (by weight) using a conventional method of mixing in which the fibres are added to a mix in small amounts without their prior treatment with a high viscosity friction-reducing substrate. Thus where glass fibres are mixed into a concrete mix in accordance with the present invention, the fibre content can be increased if desired to a point where the resulting mixture comprises a tangled mass of such fibres and even in this extreme case the fibres are evenly dispersed throughout the mix without the formation of lumps.

I claim:

1. A process for dispersing a fibre in an aqueous mix of which cement or plaster is the basic constituent, which comprises bringing the fibre content of the mix into contact with a high viscosity friction-reducing substance in the form of an aqueous solution of a water soluble polymer, said solution having a viscosity of at least 80 centipoises at 25° C., to produce an aqueous mixture and subsequently bringing together the resulting aqueous mixture and the basic constitutent.

2. A process as claimed in claim 1 in which the solution is an aqueous solution of polyethylene oxide.

3. A process as claimed in claim 2 in which the polyethylene oxide has a molecular weight of about four million.

4. A process as claimed in claim 1 in which the solution is an aqueous solution of cellulose ether.

5. A process as claimed in claim 4 in which the cellulose ether is methyl cellulose.

6. A process as claimed in claim 5 in which the methyl cellulose has a molecular weight of between 180,000 and 200,000.

7. A process as claimed in claim 1 in which the fibre is glass fibre.

8. A process as claimed in claim 1 in which the fibre is one which is not liquid absorbent.

References Cited
UNITED STATES PATENTS

| | | | |
|---|---|---|---|
| 3,271,186 | 9/1966 | Sadler et al. | 106—99 |
| 3,243,307 | 3/1966 | Selden | 106—99 |
| 3,062,670 | 11/1962 | Marzocchi et al. | 106—99 |
| 3,044,547 | 7/1962 | Jarboe | 106—99 |
| 2,793,130 | 5/1957 | Shannon et al. | 106—99 |
| 2,738,285 | 3/1956 | Biefeld et al. | 106—99 |

JAMES E. POER, Primary Examiner

U.S. Cl. X.R.
106—93, 99, 115